US010088555B2

(12) United States Patent
Bretschneider et al.

(10) Patent No.: US 10,088,555 B2
(45) Date of Patent: Oct. 2, 2018

(54) AUTOMATED METHOD FOR SELECTING TRAINING AREAS OF SEA CLUTTER AND DETECTING SHIP TARGETS IN POLARIMETRIC SYNTHETIC APERTURE RADAR IMAGERY

(71) Applicant: Airbus Singapore Private Limited, Singapore (SG)

(72) Inventors: Timo Rolf Bretschneider, Singapore (SG); Ken Yoong Lee, Singapore (SG)

(73) Assignee: AIRBUS SINGAPORE PRIVATE LIMITED, Singapore (SG)

( * ) Notice: Subject to any disclaimer, the term of this patent is extended or adjusted under 35 U.S.C. 154(b) by 0 days.

(21) Appl. No.: 15/535,997

(22) PCT Filed: Oct. 8, 2015

(86) PCT No.: PCT/IB2015/057691
§ 371 (c)(1),
(2) Date: Jun. 14, 2017

(87) PCT Pub. No.: WO2016/097890
PCT Pub. Date: Jun. 23, 2016

(65) Prior Publication Data
US 2018/0052224 A1    Feb. 22, 2018

(30) Foreign Application Priority Data
Dec. 15, 2014   (WO) .................. PCT/IB2014/066906

(51) Int. Cl.
*G01S 7/41*    (2006.01)
*G01S 13/90*   (2006.01)
*G01S 13/00*   (2006.01)

(52) U.S. Cl.
CPC .......... *G01S 7/414* (2013.01); *G01S 13/9035* (2013.01); *G01S 2013/9076* (2013.01)

(58) Field of Classification Search
CPC ................. G01S 7/414; G01S 13/9035; G01S 2013/9076; G01S 13/9023; G01S 13/9029; G01S 13/90
See application file for complete search history.

(56) References Cited

U.S. PATENT DOCUMENTS 4,829,306 A * 5/1989 Gjessing et al.
5,313,210 A * 5/1994 Gail
(Continued)

FOREIGN PATENT DOCUMENTS

WO   WO2005/043187 A1 *  5/2005  ............. G01S 7/414
WO   WO2009/144754 A1 * 12/2009  ............. G01S 13/90

OTHER PUBLICATIONS

Bretschneider, Timo Rolf; International Preliminary Report on Patentability for PCT/IB2015/057691, filed Oct. 8, 2015, dated Dec. 20, 2016, 7 pgs.

(Continued)

*Primary Examiner* — Bernarr E Gregory
(74) *Attorney, Agent, or Firm* — Jenkins, Wilson, Taylor & Hunt, P.A.

(57) ABSTRACT

Method for selecting a sea clutter training area in polarimetric synthetic aperture radar input data. A sea clutter reference distribution for a pixel magnitude value is provided. Based on the input data, one or more parameters of the reference distribution and a global covariance matrix are computed. The pixels are grouped into blocks. A block that minimizes a cost function is pre-selected, the cost function being derived from empirical moments of the block and moments of the reference distribution. A goodness-of-fit is computed for the pre-selected block with respect to the reference distribution. If the goodness-of-fit is sufficient, the (Continued)

block is selected as sea clutter training area. Otherwise, the steps of preselecting and computing a goodness of fit are repeated.

20 Claims, 14 Drawing Sheets

(56) References Cited

U.S. PATENT DOCUMENTS

| | | | |
|---|---|---|---|
| 5,677,693 | A * | 10/1997 | Frankot et al. |
| 6,952,178 | B2 * | 10/2005 | Kirscht |
| 7,006,034 | B1 * | 2/2006 | Krikorian et al. |
| 8,125,370 | B1 * | 2/2012 | Rogers et al. |
| 9,244,159 | B1 * | 1/2016 | Korchev et al. |
| 2007/0268305 | A1 | 11/2007 | Matsuo et al. |
| 2009/0174595 | A1 | 7/2009 | Khatib et al. |
| 2011/0169686 | A1 | 7/2011 | Eusebi Borzelli et al. |
| 2011/0241927 | A1 | 10/2011 | Porikli |

OTHER PUBLICATIONS

Bretschneider, Timo Rolf; International Search Report and Written Opinion for PCT/IB2015/057691, filed Oct. 8, 2015, dated Jan. 19, 2016, 12 pgs.

Ken, et al.; 'Statistical Modelling of Sea Clutter in Airborne S-Band Fully Polarimetric Synthetic Aperture Radar Imagery'; Proceedings of the 34th Asian Conference on Remote Sensing 2013; Oct. 20-24, 2013, pp. 63-69.

* cited by examiner

Table 1: Probability density function and moments of population squared radius under texture model, where texture variable follows gamma distribution

| | |
|---|---|
| Probability density function | $f(\tilde{r}) = \dfrac{2^{1-0.5\alpha-0.5p}\alpha^{0.5\alpha+0.5p}}{\Gamma(\alpha)\Gamma(p)} \tilde{r}^{0.5p+0.5\alpha-1} K_{\alpha-p}\left(\sqrt{2\alpha\tilde{r}}\right)$ |
| First moment | $E(\tilde{r}) = 2p$ |
| Second moment | $E(\tilde{r}^2) = 4p(p+1)\left(1+\dfrac{1}{\alpha}\right)$ |
| Third moment | $E(\tilde{r}^3) = 8p(p+1)(p+2)\left(1+\dfrac{3}{\alpha}+\dfrac{2}{\alpha^2}\right)$ |
| Fourth moment | $E(\tilde{r}^4) = 16p(p+1)(p+2)(p+3)\left[\dfrac{(\alpha+1)(\alpha+2)(\alpha+3)}{\alpha^3}\right]$ |

Note: $p$ refers to the dimension of complex vector.

FIG. 2

Table 2: Probability density function and moments of population squared radius under texture model, where texture variable follows inverse gamma distribution

| | |
|---|---|
| Probability density function | $f(\tilde{r}) = \dfrac{\alpha^{\alpha+1} \Gamma(\alpha+p+1)}{2^p \Gamma(\alpha+1)\Gamma(p)} \tilde{r}^{p-1} \left(\alpha + \dfrac{\tilde{r}}{2}\right)^{\alpha+p+1}$ |
| First moment | $E(\tilde{r}) = 2p$ |
| Second moment | $E(\tilde{r}^2) = 4p(p+1)\left(\dfrac{\alpha}{\alpha-1}\right)$ |
| Third moment | $E(\tilde{r}^3) = 8p(p+1)(p+2)\left(\dfrac{\alpha^2}{\alpha^2-3\alpha+2}\right)$ |
| Fourth moment | $E(\tilde{r}^4) = 16p(p+1)(p+2)(p+3)\left(\dfrac{\alpha^3}{\alpha^3-6\alpha^2+11\alpha-6}\right)$ |

Note: $p$ refers to the dimension of complex vector.

FIG. 3

Table 3: Probability density function and moments of population squared radius under texture model, where texture variable follows inverted beta distribution

| | |
|---|---|
| Probability density function | $f(\widetilde{r}) = \dfrac{\Gamma(2\alpha+1)\Gamma(p+\alpha+1)}{2^p \Gamma(\alpha)\Gamma(\alpha+1)\Gamma(p)} \widetilde{r}^{p-1} \Psi\left(p+1+\alpha, p+1-\alpha; \dfrac{\widetilde{r}}{2}\right)$ |
| First moment | $E(\widetilde{r}) = 2p$ |
| Second moment | $E(\widetilde{r}^2) = 4p(p+1)\left(\dfrac{\alpha+1}{\alpha-1}\right)$ |
| Third moment | $E(\widetilde{r}^3) = 8p(p+1)(p+2)\left(\dfrac{\alpha^2+3\alpha+2}{\alpha^2-3\alpha+2}\right)$ |
| Fourth moment | $E(\widetilde{r}^4) = 16p(p+1)(p+2)(p+3)\left[\dfrac{(\alpha+1)(\alpha+2)(\alpha+3)}{(\alpha-1)(\alpha-2)(\alpha-3)}\right]$ |

Note: $p$ refers to the dimension of complex vector and $\Psi(.)$ denotes Triconi function.

FIG. 4

Table 4: Probability density function and moments of population squared radius under texture model, where texture variable follows inverse Gaussian distribution

| | |
|---|---|
| Probability density function | $f(\tilde{r}) = 2^{-p} \sqrt{\dfrac{2\alpha}{\pi}} \dfrac{1}{\Gamma(p)} \exp(\alpha) \tilde{r}^{p-1} \left[1 + \dfrac{\tilde{r}}{\alpha}\right]^{-0.25-0.5p} K_{p+0.5}\left(\alpha\sqrt{1+\dfrac{\tilde{r}}{\alpha}}\right)$ |
| First moment | $E(\tilde{r}) = 2p$ |
| Second moment | $E(\tilde{r}^2) = 4p(p+1)\left(1 + \dfrac{1}{\alpha}\right)$ |
| Third moment | $E(\tilde{r}^3) = 8p(p+1)(p+2)\left(\dfrac{3}{\alpha^2} + \dfrac{3}{\alpha} + 1\right)$ |
| Fourth moment | $E(\tilde{r}^4) = 16p(p+1)(p+2)(p+3)\left(\dfrac{\alpha^3 + 6\alpha^2 + 15\alpha + 15}{\alpha^3}\right)$ |

Note: $p$ refers to the dimension of complex vector.

FIG. 5

Table 5: Probability density function and moments of population squared radius under texture model, where texture variable follows reciprocal inverse Gaussian distribution

| | |
|---|---|
| Probability density function | $f(\tilde{r}) = 2^{-p} \sqrt{\dfrac{2}{\pi}} \dfrac{1}{\Gamma(p)} \alpha^p (\alpha-1)^{-(p-0.5)} \exp(\alpha-1) \tilde{r}^{p-1} \left[1 + \dfrac{\alpha}{(\alpha-1)^2} \tilde{r}\right]^{0.25-0.5p} K_{p-0.5}\left((\alpha-1)\sqrt{1 + \dfrac{\alpha}{(\alpha-1)^2} \tilde{r}}\right)$ |
| First moment | $E(\tilde{r}) = 2p$ |
| Second moment | $E(\tilde{r}^2) = 4p(p+1)\left(\dfrac{\alpha^2 + \alpha + 1}{\alpha^2}\right)$ |
| Third moment | $E(\tilde{r}^3) = 8p(p+1)(p+2)\left[\dfrac{(\alpha-1)^3 + 6(\alpha-1)^2 + 15(\alpha-1) + 15}{\alpha^3}\right]$ |
| Fourth moment | $E(\tilde{r}^4) = 16p(p+1)(p+2)(p+3)\left[\dfrac{(\alpha-1)^4 + 10(\alpha-1)^3 + 45(\alpha-1)^2 + 105\alpha}{\alpha^4}\right]$ |

Note: $p$ refers to the dimension of complex vector.

FIG. 6

Table 6: Probability density function and moments of trace statistic under texture model, where texture variable follows gamma distribution

| | |
|---|---|
| Probability density function | $f(\tilde{z}) = \dfrac{2\alpha^{0.5\alpha+0.5Lp}}{\Gamma(\alpha)\Gamma(Lp)} \tilde{z}^{0.5Lp+0.5\alpha-1} K_{\alpha-Lp}(2\sqrt{\alpha\tilde{z}})$ |
| First moment | $E(\tilde{z}) = Lp$ |
| Second moment | $E(\tilde{z}^2) = Lp(Lp+1)\left(1+\dfrac{1}{\alpha}\right)$ |
| Third moment | $E(\tilde{z}^3) = p(p+1)(p+2)\left(1+\dfrac{3}{\alpha}+\dfrac{2}{\alpha^2}\right)$ |
| Fourth moment | $E(\tilde{z}^4) = p(p+1)(p+2)(p+3)\dfrac{(\alpha+1)(\alpha+2)(\alpha+3)}{\alpha^3}$ |

Note: $p$ refers to the dimension of polarimetric covariance matrix.

FIG. 7

Table 7: Probability density function and moments of trace statistic under texture model, where texture variable follows inverse gamma distribution

| | |
|---|---|
| Probability density function | $f(\tilde{z}) = \dfrac{\alpha^{\alpha+1}\Gamma(\alpha+Lp+1)}{\Gamma(\alpha+1)\Gamma(Lp)} \tilde{z}^{Lp-1}(\alpha+\tilde{z})^{\alpha+Lp+1}$ |
| First moment | $E(\tilde{z}) = Lp$ |
| Second moment | $E(\tilde{z}^2) = Lp(Lp+1)\left(\dfrac{\alpha}{\alpha-1}\right)$ |
| Third moment | $E(\tilde{z}^3) = Lp(Lp+1)(Lp+2)\left(\dfrac{\alpha^2}{\alpha^2-3\alpha+2}\right)$ |
| Fourth moment | $E(\tilde{z}^4) = Lp(Lp+1)(Lp+2)(Lp+3)\left(\dfrac{\alpha^3}{\alpha^3-6\alpha^2+11\alpha-6}\right)$ |

Note: $p$ refers to the dimension of polarimetric covariance matrix.

FIG. 8

Table 8: Probability density function and moments of trace statistic under texture model, where texture variable follows inverted beta distribution

| | |
|---|---|
| Probability density function | $f(\tilde{z}) = \dfrac{\Gamma(2\alpha+1)\Gamma(Lp+\alpha+1)}{\Gamma(\alpha)\Gamma(\alpha+1)\Gamma(Lp)} \tilde{z}^{Lp-1} \Psi(Lp+1+\alpha, Lp+1-\alpha; \tilde{z})$ |
| First moment | $E(\tilde{z}) = Lp$ |
| Second moment | $E(\tilde{z}^2) = Lp(Lp+1)\left(\dfrac{\alpha+1}{\alpha-1}\right)$ |
| Third moment | $E(\tilde{z}^3) = Lp(Lp+1)(Lp+2)\left(\dfrac{\alpha^2+3\alpha+2}{\alpha^2-3\alpha+2}\right)$ |
| Fourth moment | $E(\tilde{z}^4) = Lp(Lp+1)(Lp+2)(Lp+3)\left[\dfrac{(\alpha+1)(\alpha+2)(\alpha+3)}{(\alpha-1)(\alpha-2)(\alpha-3)}\right]$ |

Note: $p$ refers to the dimension of polarimetric covariance matrix and $\Psi(.)$ denotes Tricomi function.

FIG. 9

Table 9: Probability density function and moments of trace statistic under texture model, where texture variable follows inverse Gaussian distribution

| | |
|---|---|
| Probability density function | $f(\tilde{z}) = \sqrt{\dfrac{2\alpha}{\pi}} \dfrac{1}{\Gamma(Lp)} \exp(\alpha) \tilde{z}^{Lp-1} \left[1 + \dfrac{2\tilde{z}}{\alpha}\right]^{-0.25-0.5Lp} K_{Lp+0.5}\left(\alpha\sqrt{1 + \dfrac{2\tilde{z}}{\alpha}}\right)$ |
| First moment | $E(\tilde{z}) = Lp$ |
| Second moment | $E(\tilde{z}^2) = Lp(Lp+1)\left(1 + \dfrac{1}{\alpha}\right)$ |
| Third moment | $E(\tilde{z}^3) = Lp(Lp+1)(Lp+2)\left(\dfrac{3}{\alpha^2} + \dfrac{3}{\alpha} + 1\right)$ |
| Fourth moment | $E(\tilde{z}^4) = Lp(Lp+1)(Lp+2)(Lp+3)\left(\dfrac{\alpha^3 + 6\alpha^2 + 15\alpha + 15}{\alpha^3}\right)$ |

Note: $p$ refers to the dimension of polarimetric covariance matrix.

FIG. 10

Table 10: Probability density function and moments of trace statistic under texture model, where texture variable follows reciprocal inverse Gaussian distribution

| | |
|---|---|
| Probability density function | $f(\widetilde{z}) = \sqrt{\dfrac{2}{\pi}} \dfrac{1}{\Gamma(Lp)} \alpha^{Lp}(\alpha-1)^{-(Lp-0.5)} \exp(\alpha-1)\widetilde{z}^{Lp-1} \left[1 + \dfrac{2\alpha}{(\alpha-1)^2}\widetilde{z}\right]^{0.25-0.5Lp} K_{Lp-0.5}\left((\alpha-1)\sqrt{1 + \dfrac{2\alpha}{(\alpha-1)^2}\widetilde{z}}\right)$ |
| First moment | $E(\widetilde{z}) = Lp$ |
| Second moment | $E(\widetilde{z}^2) = Lp(Lp+1)\left(\dfrac{\alpha^2+\alpha+1}{\alpha^2}\right)$ |
| Third moment | $E(\widetilde{z}^3) = Lp(Lp+1)(Lp+2)\left[\dfrac{(\alpha-1)^3 + 6(\alpha-1)^2 + 15\alpha}{\alpha^3}\right]$ |
| Fourth moment | $E(\widetilde{z}^4) = Lp(Lp+1)(Lp+2)(Lp+3)\left[\dfrac{(\alpha-1)^4 + 10(\alpha-1)^3 + 45(\alpha-1)^2 + 105\alpha}{\alpha^4}\right]$ |

Note: $p$ refers to the dimension of polarimetric covariance matrix.

FIG. 11

AUTOMATED METHOD FOR SELECTING TRAINING AREAS OF SEA CLUTTER AND DETECTING SHIP TARGETS IN POLARIMETRIC SYNTHETIC APERTURE RADAR IMAGERY

CROSS-REFERENCE TO RELATED APPLICATIONS

This application is a National Stage Entry of PCT International Application number PCT/IB2015/057691, filed Oct. 8, 2015, which claims the benefit of PCT International Application number PCT/IB2014/066906, filed Dec. 15, 2014, the entire disclosures of which are hereby incorporated herein by this reference in their entireties.

TECHNICAL FIELD

The present application relates to target detection in a Synthetic Aperture Radar (SAR) imaged sea area. Specifically, this application relates to an automated method for selecting training areas of sea clutter and detecting ship targets in polarimetric synthetic aperture radar imagery.

BACKGROUND

To date, there has been considerable interest in detecting ship targets in airborne and spaceborne SAR. A direct statistical modelling of ship targets in SAR data is ideally preferred for ship detection, but it is challenging and complicated due to different ship types and structures. Consequently, sea clutter is chosen and modelled statistically instead, where all potential ship targets are detected in a reverse way by suppressing sea clutter. In the literature, numerous research works have been carried out for modelling sea clutter in airborne and spaceborne SAR data. These sea clutter statistical models use Gaussian statistics and non-Gaussian statistics. The so-called non-Gaussian statistics, such as K-distribution, log-normal distribution, Weibull distribution and others, were found to model sea clutter well, in particular for relatively high-resolution SAR data. Some relevant references are Jakeman E. and Pusey P. N., 1976, A model for non-Rayleigh sea echo. *IEEE Transactions on Antennas and Propagation*, AP-24(6), pages 806-814, Eltoft T. and Høgda K. A., 1998, Non-Gaussian signal statistics in ocean SAR imagery. *IEEE Transactions on Geoscience and Remote Sensing*, 36(2), pages 562-575, and Ward K., Tough R., and Watts S., 2013, *Sea Clutter: Scattering, the K distribution and Radar Performance*. London: The Institution of Engineering and Technology. Second edition.

Often sea clutter modelling was conducted and reported by using only amplitude or intensity component rather than utilizing the complete scattering vector or polarimetric covariance matrix, which is available in fully polarimetric SAR data.

For ship detection, four main steps are generally involved, namely 1) land masking, 2) pre-processing, 3) prescreening, and 4) discrimination. The first step is to mask out land areas since only ships in the water are of interest. Moreover, this can help to reduce false alarms caused by land cover features. In the second step, image enhancement is carried out, which is optional provided that a constant false alarm rate detector is employed for the subsequent prescreening. Then, the prescreening step, which is the most crucial step, identifies potential ship pixels in the masked input image. The final step, that is discrimination, is to reduce the false alarm rate. For instance, the observation of a ship wake can be employed to confirm the presence of a moving ship.

In the literature, numerous prescreening algorithms have been proposed for the prescreening step. These can be generally grouped into two categories, namely global and local processing approaches. In the global processing approach, an image pixel is marked as a potential ship pixel if its intensity or test statistic is greater than a predefined global threshold. For example, Lin, I-I, Kwoh, L. K., Lin, Y.-C., and Khoo, V., 1997. Ship and ship wake detection in the ERS SAR imagery using computer-based algorithm. *Proceedings of IEEE International Geoscience and Remote Sensing Symposium*, vol. 1, pages 151-153, and Liu, C., Vachon, P. W., and Geling, G. W., 2005. Improved ship detection with airborne polarimetric SAR data. *Canadian Journal of Remote Sensing*, 31(1), pages 122-131.

applied this approach for ship detection in ERS SAR PRI and CV-580 SAR images, respectively. A careful threshold selection is prerequisite to successful ship detection by using this approach.

In the local processing approach, a local processing window is normally required. According to the local processing approach, the processing window consists of a test pixel, which is surrounded by a guard ring and then by a background ring. The design of the guard ring is to exclude a possible extended ship target from a background ring and, hence, the background ring contains purely sea clutter. Local processing approaches have received a great deal of attention in ship detection (see Zhang, F. and Wu, B., 2008. A scheme for ship detection in inhomogeneous regions based on segmentation of SAR images. *International Journal of Remote Sensing*, 29(19), pages 5733-5747 and Allard, Y., Germain, M., and Bonneau, O., 2009. Ship detection and characterization using polarimetric SAR data. In Shahbazian E., Rogova G., and DeWeert M. J. (Eds.), *Harbour Protection Through Data Fusion Technologies* (pages 243-250). Dordrecht: Springer). However, the restriction with these approaches, in particularly for very high-resolution SAR data, is that the window size needs to be varied accordingly with different sizes of ship targets in order to enable an efficient detection.

SUMMARY

It is an object of the application to provide an improved automated method for selecting training areas of sea clutter and detecting ship targets in polarimetric synthetic aperture radar imagery.

The application provides detection of boats/ships (called targets) in airborne/spaceborne synthetic aperture radar data by means of statistical modelling of sea clutter and then inferring the actual targets. This approach enables the detection of any type of target from statistically diverse and difficult to describe group of potential targets. Moreover, this application demonstrates that even small targets with a low radar cross section can be detected reliably.

For low-resolution SAR data, the use of multivariate complex Gaussian distribution is always valid and accepted for sea clutter modelling. However, due to the significant decreasing number of scatterers per resolution cell in more highly resolved image data, non-Gaussian distributions were found to be more reliable when dealing with very-high resolution SAR imagery. In the literature, sea clutter modelling was often conducted and reported by using only amplitude or intensity component rather than utilising the complete scattering vector or the polarimetric covariance matrix, which is available in fully polarimetric SAR data. The same situation also applies to the subsequent ship detection process. See the description for further discussion.

To ease the selection of training areas, the so-called homogeneous and texture models of sea clutter are formulated based on the squared radius and trace statistic for both single- and multi-look polarimetric SAR data, respectively. To detect ship targets, a constant false alarm rate detector is developed based on the idea of outlier detection together with the use of both the squared radius and trace statistic.

The application provides an automated procedure for selecting training areas of sea clutter and detecting potential ship targets in very high-resolution single- and multi-look polarimetric SAR data. No additional speckle filtering is needed for both the selection of sea clutter areas as well as ship target detection. The procedure not only can be easily simplified for single-polarization SAR data, but also can be simply extended for multi-frequency SAR data. The mathematical formulation of the application is suitable for near real-time hardware implementations.

In a first aspect, the present specification discloses a computer implemented method for automatically selecting at least one sea clutter training area in single look polarimetric synthetic aperture radar imagery.

Input data which represents a digital radar image of a polarimetric synthetic aperture radar is provided via a data link, a data carrier or a radar device.

The input data comprises pixels or pixel values. The pixel values represent amplitude and phase values of electromagnetic signals. In general, the pixels or pixel values are obtained from the raw signal data by processing the raw signal data with an SAR processor. Likewise, the division of the raw signal data into pixels corresponding to the same geographical location but to different looks may be obtained through suitable processing of the raw signal data with an SAR processor.

The looks correspond to scattered signals, which are scattered from the same geographical location but which are received from different angles. The relative motion of the signal source to the ground, and hence the Doppler shift, depends on the angle of inclination. Therefore, the looks may be obtained by partitioning the raw data according to a frequency of the received signal. A summation over the looks can be used for reducing speckle noise. By way of example, a number L of looks may be between 2 and 10 looks.

Furthermore, a sea clutter reference distribution is provided for a pixel magnitude, such as the population squared radius, which is defined below. The sea clutter reference distribution follows a texture model. According to the texture model the pixel values follow a distribution of a variable which is the product of the square root of a scalar texture variable and a vector valued variable that is distributed according to a multivariate Gaussian distribution (see equation (3) below).

The pixel values are defined below in equation (1). One or more parameters, such as a shape parameter $\alpha$, of the sea clutter reference distribution are computed based on the pixels of the input data.

A global covariance matrix $\Sigma$ is computed based on the input data, in particular according to $\Sigma\_ij=E[(s\_i-E[s\_i])^*(s\_j-E[s\_j])]$, wherein $s\_i$, $s\_j$ are pixel components with $i,j=1,2,3$ for pixels having three components, and $E[s]$ is formed by computing the arithmetic mean over the pixels.

The pixels of the input data are grouped into blocks, especially into blocks corresponding to a rectangular image area, such as 200×200 pixel blocks. By way of example, the grouping can be realized by indexing the pixels and by processing the pixels belonging to the indices of the respective block, wherein the pixel indices correspond to the respective locations in computer memory of the pixels, which may be contiguous or non-contiguous.

For each block, a pixel magnitude, such as the population squared radius is computed using the inverse of the global covariance matrix. The population squared radius is proportional to a scalar product of a pixel with itself, wherein the scalar product is defined by the inverse of the covariance matrix.

For each block, one or more empirical moments of the pixel magnitude are computed for the pixels of the block. One or more reference moments of the pixel magnitude are computed using the sea clutter reference distribution. For example, if the sea clutter reference distribution of Table 1 of FIG. 2 is used, the third and fourth moments are computed as $8*3*(3+1)*(3+2)*(1+3/\alpha+2/\alpha^2)$ and $16*(3+1)*(3+2)*(3+3)*(\alpha+1)(\alpha+2)(\alpha+3)/\alpha^3$, for a three component vector, using the previously computed parameter $\alpha$.

For each block, a cost function is computed. The computation of the cost function comprises the computation of respective differences between the empirical moments and the reference moments, in particular the cost function may defined by the sum of the absolute values of the differences or the sum of the square of the differences. The differences of the cost function may also be multiplied by positive weighting factors.

A block is pre-selected yields a smallest value of the cost function or, in other words, which minimizes the cost function. Herein, minimizing refers to the absolute value of the cost function, which is conventionally defined as a positive valued function.

A goodness-of-fit test is computed for the pixel magnitude of the pixels of the pre-selected block compared to the sea clutter reference distribution. The goodness-of-fit test may be implemented by computing a histogram of the magnitudes and comparing the histogram to the sea clutter distribution, for example by using a chi-squared test.

The pre-selected block is selected as a sea clutter training area if the block passes the goodness-of-fit test, else the steps of pre-selecting a block and calculating the goodness-of-fit test are repeated until a block is found which passes the goodness-of-fit test.

Furthermore, the current specification discloses a computer implemented method for automatically selecting at least one sea clutter training area in multi-look polarimetric synthetic aperture radar imagery. For the sake of brevity, explanations which apply in the same way to the multi-look data are not repeated here.

The method for multi-look data is similar to the above-mentioned method for single look data. Different from the procedure for single look data, a sum magnitude is used instead of the pixel magnitude. Among others, the sum magnitude can be computed as a matrix trace or as a sum of scalar products of pixels of the respective looks, wherein the scalar products are defined by the inverse of a covariance matrix.

In particular, the sum magnitude can be obtained by computing the trace of a Z-matrix or a value proportional to the trace of the Z-matrix. The Z-matrix is defined further below in the text under equation (11). The Z-matrix is derived from the inverse of the global covariance matrix, or the matrix square root thereof, and the pixel values of the respective looks.

According to another embodiment, the sum magnitude can be obtained by computing a sum of scalar products of corresponding pixels of the respective looks, wherein the scalar product is defined by the inverse of a respective covariance matrix. The sum magnitude and the pixel magnitude are also referred to as "magnitude value".

A reference to the selected sea clutter training area is stored for later use, such as for calculating a covariance matrix or other statistical properties of the sea clutter training area. In one example, the reference comprises pixel indices of the selected sea clutter training area. Among others, the reference to the selected area may be stored in a memory area, which is attributed to a running program by an operating system, or they may be stored persistently on a hard disk or other kind of computer memory.

According to the training area selection method for multi-look data, input data of a polarimetric synthetic aperture radar is provided. The input data comprises pixels. The pixels comprise, or represent, amplitude and phase values of electromagnetic signals, or polarization components thereof, and wherein the pixels correspond to a given image location and a given look.

A sea-clutter reference distribution is provided for a sum magnitude, which is derived from pixels corresponding to the same location and to the respective looks as described above. One or more parameters of the sea clutter reference distribution are estimated based on the input data.

The pixels are grouped into blocks. For each block and for each pixel location of the pixels in the block, the sum magnitude is computed. Furthermore, one or more empirical moments of the sum magnitude are computed for the pixels of a block and one or more reference moments of the sea-clutter reference distribution are computed. By way of example, a pixel location can be defined by corresponding indices i, j of a two dimensional array.

For each block of pixels, a cost function is computed, wherein the computation of the cost function comprises the computation of respective differences between the empirical moments and the reference moments. A block which yields a smallest value of the cost function or, in other words, which minimizes the cost function is preselected.

A goodness-of-fit test is computed for the sum magnitude of the pixels of the pre-selected block compared to the sea clutter reference distribution and the pre-selected block is selected as a sea clutter training area if the block passes the goodness-of-fit test. Otherwise, the steps of pre-selecting a block and calculating the goodness-of-fit test are repeated until a block is found which passes the goodness-of-fit test.

In particular, the sea clutter reference distribution is the distribution of a magnitude or a sum magnitude of a first vector valued random variable which represents a pixel. Herein, the magnitude may in particular be defined by a scalar product of the random variable with itself, wherein the scalar product is defined by the inverse of a covariance matrix, or by a sum of inner products.

An inner product $<x, y>_A$ of two column vectors x, y can be defined by a positive definite matrix A, such as the covariance matrix $\Sigma$ or its inverse, according to the definition $<x, y>_A := x^{*T} A x$, wherein "T" represents the matrix transposition and "*" the complex conjugate.

In particular embodiments, the first vector valued random variable is the product of the square root of a texture variable with a second vector valued variable, which represents a uniform sea clutter. The second vector valued variable s is distributed according to a multivariate Gaussian distribution. The distribution of the texture variable is selected from a gamma distribution, an inverse gamma distribution, an inverted beta distribution, an inverse Gaussian distribution and a reciprocal inverse Gaussian distribution. In other words, the sea clutter reference distribution is equal to one of the distributions of the Tables 1 to 5.

In particular embodiments of the multi-look data procedure the sea clutter reference distribution of the sum magnitude is equal to the distribution of a random variable which is the product of a texture variable t and a variable z. Herein, the variable z is assumed to be distributed according to a gamma distribution. In a particular embodiment, the variable z is equal to the trace of a Z-matrix, which is defined further below in the text below equation (11), or to a value that is proportional to the Z-matrix trace.

The distribution of the texture variable t is selected from a gamma distribution, an inverse gamma distribution, an inverted beta distribution, an inverse Gaussian distribution and a reciprocal inverse Gaussian distribution. In other words, the sea clutter reference distribution is equal to one of the distributions shown in Tables 6 to 10. The distribution of the sum magnitude is also referred to as "trace statistics".

According to one specific embodiment, the computation of the abovementioned cost function comprises a computation of the respective differences between the empirical third moment and the third moment of the sea clutter reference distribution and between the empirical fourth moment and the fourth moment of the sea clutter reference distribution, wherein the empirical moments and the reference moments are moments with respect to the magnitude value, which is the pixel magnitude or the sum magnitude.

In one particular embodiment, the goodness-of-fit test is implemented as a chi-squared test, in particular as Pearson's chi-squared test.

In a further embodiment, the method comprises a ship detection. A covariance matrix is estimated from the pixels of the selected sea clutter training area. For every pixel in the input data a magnitude value of the pixel is computed, wherein for multi-look data the magnitude value refers to a pixel location or to the pixels corresponding to the same geographical location. Herein, the magnitude value refers to the pixel magnitude for single-look input data and to the sum magnitude for multi-look input data.

A pixel, or a pixel location, is marked as a ship pixel if a magnitude value of the pixel exceeds a pre-determined threshold u, the threshold u being determined by a pre-determined probability of false alarm for the sea clutter reference distribution.

According to a further embodiment, the method comprises a prior step of masking out land areas. By way of example, the masking out may be done according to a matching with a stored cost line map and/or by using a model for the reflectivity of land areas. Among others, the matching with the stored cost line map by done by using a GPS position information that is stored with the image raw data or by matching the radar reflectivity pattern to a stored coast line. Similarly, the ship detection may also comprise a prior step of masking out land areas.

According to a further aspect, the present specification discloses a computer instruction set or a computer program for executing the steps of one of the abovementioned methods, a computer readable memory comprising the computer instruction set and a computation unit, such as a special purpose integrated circuit, computer readable memory, or a microprocessor, for executing the steps of one of the abovementioned methods.

According to yet a further aspect, the current specification discloses a ship detection device having a connection for receiving synthetic aperture radar input data, which may be transmitted over a network, a wireless communication link, a data carrier or received from a radar device.

Furthermore, the ship detection device comprises a digitization unit for converting the received data into digital data an SAR processor for converting the raw signal data into SAR pixel data, and an image buffer for storing SAR pixel data.

Furthermore, a block partitioning unit is provided for partitioning the input data into blocks of pixels, and a sea clutter selection unit for selecting one or more of the blocks as a sea clutter training area according to the conformance of the pixel values to a pre-determined sea clutter reference distribution.

A sea clutter statistics calculation unit is provided for deriving a sea clutter covariance matrix from pixel values of the selected sea clutter training area. A pixel identification unit is provided for identifying pixels, or pixel locations as target pixels based on a magnitude value, the magnitude value being derived from the sea clutter covariance matrix and the pixel values of the pixel or of the pixel location. Furthermore, a results buffer is provided for storing the pixel identification results.

According to a further embodiment, the ship detection device of comprises a sea clutter training area pre-selection unit for pre-selecting one or more of the blocks. The pre-selection is based on a difference between an empirical third moment of the magnitude value of the pixels in the block and a third moment of the sea clutter reference distribution and based on a difference between an empirical fourth moment of the magnitude value of the pixels in the block and a fourth moment of the sea clutter reference distribution. The sea clutter selection unit uses the pixels of the one or more pre-selected blocks as input values.

BRIEF DESCRIPTION OF THE DRAWINGS

The subject matter of the present specification is further explained with respect to the following Figures in which FIG. 2 illustrates a table showing probability density function and moments of population squared radius under texture model, where texture variable follows gamma distribution, FIG. 3 illustrates a table showing probability density function and moments of population squared radius under texture model, where texture variable follows inverse gamma distribution, FIG. 4 illustrates a table showing probability density function and moments of population squared radius under texture model, where texture variable follows inverted beta distribution, FIG. 5 illustrates a table showing probability density function and moments of population squared radius under texture model, where texture variable follows inverse Gaussian distribution, FIG. 6 illustrates a table showing probability density function and moments of population squared radius under texture model, where texture variable follows reciprocal inverse Gaussian distribution, FIG. 7 illustrates a table showing probability density function and moments of trace statistic under texture model, where the texture variable follows a gamma distribution, FIG. 8 illustrates a table showing probability density function and moments of trace statistic under texture model, where the texture variable follows an inverse gamma distribution, FIG. 9 illustrates a table showing probability density function and moments of trace statistic under texture model, where the texture variable follows an inverted beta distribution, FIG. 10 illustrates a table showing probability density function and moments of trace statistic under texture model, where the texture variable follows an inverse Gaussian distribution, and FIG. 11 illustrates a table showing probability density function and moments of trace statistic under texture model, where the texture variable follows a reciprocal inverse Gaussian distribution.

DETAILED DESCRIPTION

In the following description, details are provided to describe embodiments of the application. It shall be apparent to one skilled in the art, however, that the embodiments may be practiced without such details.

1. Introduction

Figure 1:
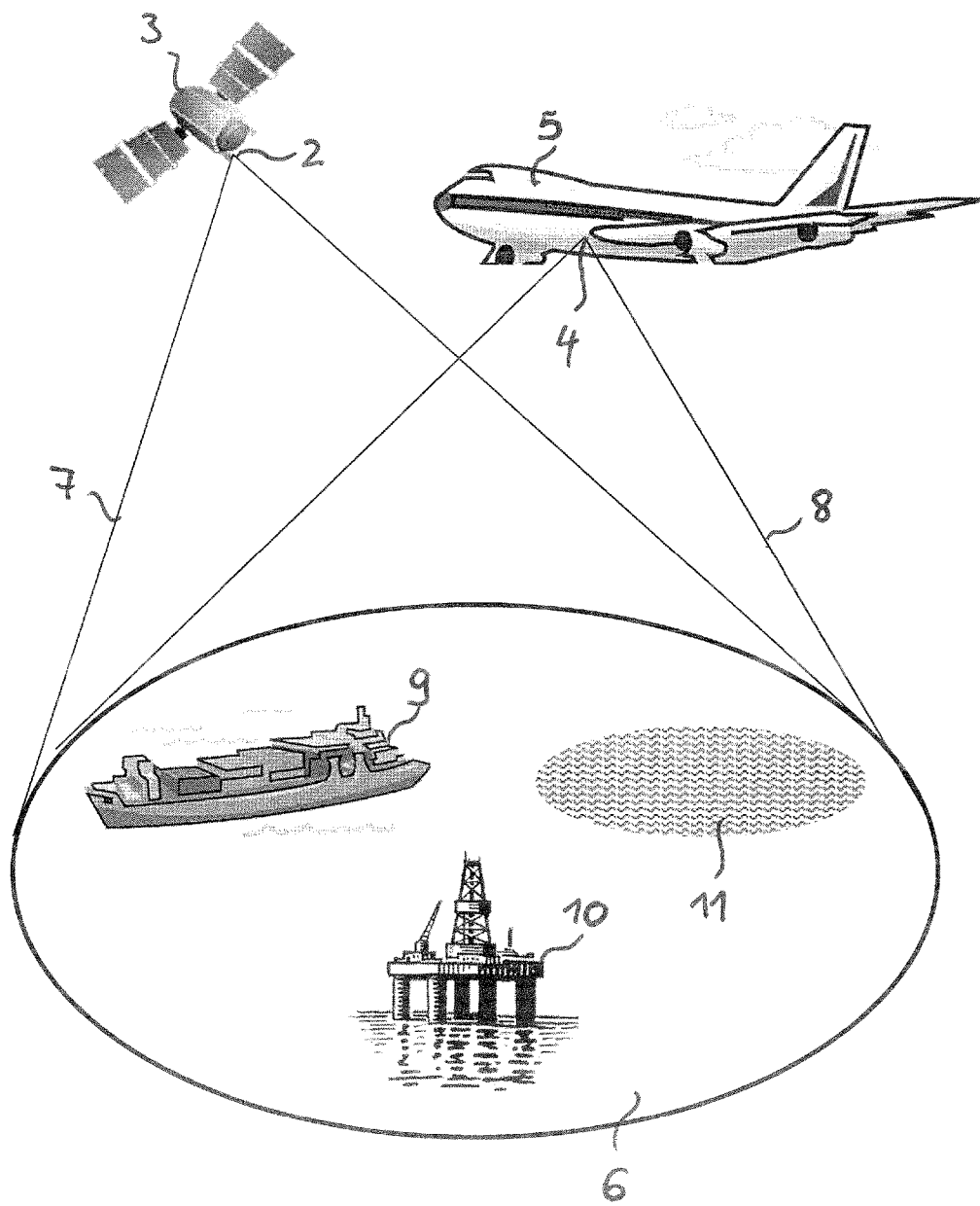
FIG. 1 illustrates a generation process of SAR images.

FIG. 1 illustrates a generation process of SAR images by way of example. According to a first embodiment, a first SAR radar is provided on board of a satellite 3. According to an alternative second embodiment, which is also shown in FIG. 1, a second SAR radar 4 is provided on a bottom area of an aircraft 5.

A sea area 6 is covered by a first radar cone 7 of the first SAR radar 2 or, alternatively, by a second radar cone 8 of the second SAR radar 4. By way of example, the sea area 6 of FIG. 1 comprises a ship 9, an oil rig 10 and an area 11 of sea clutter.

During operation, an SAR radar 2, 4 according to the present specification sends out polarized electromagnetic waves which are polarized in a first direction, which is referred to as "vertical", or in a second direction, which is orthogonal to the first direction and which is referred to as "horizontal".

The SAR radar receives scattered radiation, which is scattered back from the sea surface, from the land or from other objects and detects the polarization of received backscattered radiation. The relationship between the vertically and horizontally polarized components of the emitted or incident electric field to the components of the scattered electric field can be described by the components of the scattering or Sinclair matrix as $$\begin{bmatrix} E_H^s \\ E_V^s \end{bmatrix} = \begin{bmatrix} s_{HH} & s_{HV} \\ s_{VH} & s_{VV} \end{bmatrix} \cdot \begin{bmatrix} E_H^i \\ E_V^i \end{bmatrix} \qquad (0)$$

The relationship between the incident and scattered electric field may also comprise further proportionality or scaling factors. In particular, the proportionality factor may take the form exp(ikr)/r, wherein r is the distance between the emitter and the scattering object. In general, the factor may be more complicated, for example it may take into account atmospheric damping, scattering and reflection.

In single-look fully polarimetric SAR data, each pixel can be represented by a three-dimensional complex vector as $$s = \begin{bmatrix} s_{HH} \\ s_{HV} \\ s_{VV} \end{bmatrix} = \begin{bmatrix} \Re(s_{HH}) + j\Im(s_{HH}) \\ \Re(s_{HV}) + j\Im(s_{HV}) \\ \Re(s_{VV}) + j\Im(s_{VV}) \end{bmatrix}, \quad (1)$$

where $j=\sqrt{-1}$. The symbols $\Re(\cdot)$ and $\Im(\cdot)$ denote the real and imaginary parts of the backscattered complex signal s, respectively. Herein, a complex representation is used to represent amplitude and phase of an electromagnetic signal. The three component representation of equation (1) is based on the assumption that the scattering medium is, within sufficient accuracy, a reciprocal medium for which s_HV=s_VH.

As presented in Lee and Bretschneider (2012), the complex vector s of homogeneous sea clutter (hereafter called homogeneous model) can be assumed to be independent and identically distributed as a zero-mean trivariate complex Gaussian $$f(s) = \pi^{-3}|\Sigma|^{-1}\exp(-s^{*T}\Sigma^{-1}s), \quad (2)$$

where $\Sigma$ represents the population covariance matrix, which is positive definite. The symbols * and T denote the complex conjugate and transpose, respectively. The notation |•| refers to the matrix determinant. The population squared radius $2s^{*T}\Sigma^{-1}s$ follows a chi-squared distribution with six degrees of freedom. The proof is given in Appendix A of Lee and Bretschneider (2012).

In most cases the population covariance matrix remains unknown. This parameter can, however, be estimated from the samples based on maximum likelihood method. As proven in Appendix B of Lee and Bretschneider (2012), the exact distribution of the sample squared radius is a beta distribution. It depends merely on the vector dimension and the number of samples N. As N tends to infinity, it is shown in Appendix A of Lee and Bretschneider (2013) that the limiting distribution of the sample squared radius is expectably the chi-squared distribution with six degrees of freedom.

The complex vector of heterogeneous sea clutter, on the other hand, can be modelled based on the so-called texture model, which is also known as product model. In this case, the complex vector is represented in the form of $$\tilde{s} = \sqrt{t}s, \quad (3)$$

where the complex vector s follows a zero-mean trivariate complex Gaussian distribution in (2).

The real positive scalar random variable t, which represents texture variation, can be assumed to be gamma-distributed with its scale parameter of $1/\alpha$ and shape parameter of $\alpha$:

$$f(t) = \frac{\alpha^{\alpha}}{\Gamma(\alpha)} t^{\alpha-1} \exp(-\alpha t). \quad (4)$$

The corresponding mean and variance are separately E(t)=1 and var(t)=$1/\alpha$, wherein E(X) refers to the expectation value of the random variable X and var(X) refers to $E[(X-E[X])^2]$. For a large value of $\alpha$, the variance approaches zero, which implies that sea clutter under study is more homogeneous.

Since both t and s are statistically independent, the complex vector $\tilde{s}$ has a zero mean. Moreover, both $\tilde{s}$ and s share the same covariance matrix. The verifications are straightforward as follows:

$$E(\tilde{s}) = E(\sqrt{t}s) = E(\sqrt{t})E(s) = E(\sqrt{t})0 = 0 \quad (5)$$

and $$E(\tilde{s}\tilde{s}^{*T}) = E(tss^{*T}) = E(t)E(ss^{*T}) = E(ss^{*T}) = \Sigma \quad (6)$$

Keeping all these aspects in mind, the population squared radius under texture model, i.e. $\tilde{r} = 2\tilde{s}^{*T}\Sigma^{-1}\tilde{s}$, is found in Lee and Bretschneider (2013, Appendix B) to be distributed as $$f(\tilde{r}) = \frac{2^{-(\alpha+3)/2}\alpha^{(\alpha+3)/2}}{\Gamma(\alpha)} \tilde{r}^{(\alpha+1)/2} K_{\alpha-3}(\sqrt{2\alpha\tilde{r}}), \quad (7)$$

where $K_v(x)$ is the modified Bessel function of second kind with an order of v. From Table 1, the first and second moments of $\tilde{r}$ are $E(\tilde{r})=6$ and $E(\tilde{r}^2)=(48\alpha+48)/\alpha$. It is noted here that the second moment can be employed to estimate the shape parameter $\alpha$. Herein, the n-th moment m_n of a scalar random variable, such as the population squared radius or the texture variable, is defined as the expectation value of the n-th power of the random variable, m_n=E(x^n).

Apart from the gamma distribution, the texture variable t might also follow other statistical distributions, such as inverse gamma distribution, inverted beta distribution, inverse Gaussian distribution, reciprocal inverse Gaussian distribution etc. In these cases, the probability density functions and moments of the population squared radius are tabulated in Tables 2-5.

For multi-look fully polarimetric SAR data, each pixel can be represented by the so-called polarimetric covariance matrix:

$$C = \frac{1}{L}\sum_{i=1}^{L} s_i s_i^{*T}, \quad (8)$$

wherein L denotes the number of looks. The Hermitian matrix W=LC follows a p-variate (p=3) central complex Wishart distribution for a homogeneous area (Lee and Bretschneider 2011). Let $Z=\Sigma^{-1/2}W\Sigma^{-1/2}$, then the pdf of $Z(L\geq p)$ is given as $$f(z) = \frac{1}{\Gamma_p(L)} |Z|^{L-p} \exp\{-\text{tr}(Z)\}. \quad (9)$$

The operator tr refers to the matrix trace and $\Gamma_p(L)$ is the complex multivariate gamma function.

All diagonal elements of Z are statistically independent and gamma-distributed with unit scale parameter and a shape parameter of L. Based on the reproductive property of gamma distribution, the trace statistic under homogeneous model, i.e. z=tr(Z), can be easily shown to be gamma-distributed:

$$f(z) = \frac{1}{\Gamma(Lp)} z^{Lp-1} \exp(-z). \quad (10)$$

In the reference Lee (1994), the polarimetric covariance matrix under texture model is given by $$\tilde{C} = tC. \quad (11)$$

The corresponding trace statistic $\tilde{z}=\text{tr}(tZ)=tz$ is shown in Lee and Bretschneider (2013, Appendix D) to have the following probability density function (see also Table 6 in FIG. 7):

$$f(\tilde{z}) = \frac{2}{\Gamma(Lp)\Gamma(\alpha)} \alpha^{\frac{\alpha}{2}+\frac{Lp}{2}} \tilde{z}^{\frac{\alpha}{2}+\frac{Lp}{2}-1} K_{\alpha-Lp}(2\sqrt{\alpha \tilde{z}}). \quad (12)$$

As shown in Table 6, the first and second moments of $\tilde{z}$ are $E(\tilde{z})=Lp$ and $E(\tilde{z}^2)=(1+1/\alpha)(L^2p^2+Lp)$. The parameter $\alpha$ in (12) can be evaluated by using the second moment.

Apart from the gamma distribution, the texture variable t might also follow other statistical distributions, such as inverse gamma distribution, inverted beta distribution, inverse Gaussian distribution, reciprocal inverse Gaussian distribution etc. In these cases, the probability density functions and moments of the trace statistic are tabulated in Tables 7-10.

2. Automated Selection of Training Areas of Sea Clutter

A block-by-block processing is employed for finding the best training area of sea clutter. The procedures consist of two main steps, 1) pre-selection based on difference between empirical and theoretical moments and 2) goodness of fit (GOF) using Pearson's chi-squared test.

For single-look polarimetric SAR data, the population squared radius is first computed for each pixel in one block. Then, the third and fourth moments of the population squared radius are calculated for each block. The block which minimises the following cost function will be pre-selected for the subsequent GOF test:

$$c = |\hat{m}_3 - m_3| + |\hat{m}_4 - m_4|, \quad (13)$$

where $\hat{m}_3$ (or $\hat{m}_4$) refers to the empirical third (or fourth) moment. The theoretical third (or fourth) moment $\hat{m}_3$ (or $\hat{m}_4$) can be found in Tables 1-5.

In the second step, the chi-squared test statistic, which is employed for goodness of fit, is computed. It is defined as $$\chi^2 = \sum_{i=1}^{k} \frac{(O_i - E_i)^2}{E_i}, \quad (14)$$

where k denotes the number of bins. The symbols $O_i$ and $E_i$ represent the observed frequency and expected (or theoretical) frequency for bin i, respectively. A block which contains purely sea clutter should normally pass the chi-squared test. Note that more training areas can be located by repeating the same selection procedures.

A grouping into bins with respective frequencies of values, as in formula (14) is also referred as creating a histogram. In particular, the bins 1 to k group the possible values of the population squared radius into value ranges and the frequencies refer to the number of observations $O\_i$ in the respective bin i. The expected frequencies $E\_i$ are calculated according to an assumed probability distribution, which is also referred to as sea clutter reference distribution. The number of degrees of freedom of the chi-squared distribution for the goodness of fit test is given by the number k of bins minus a number r of parameters.

For multi-look polarimetric SAR data, the selection procedures can be extended by replacing the use of the population squared radius with the trace statistic.

3. Ship Detection

For single-look (or multi-look) polarimetric SAR data, ship detection is carried out based on the aforementioned population squared radius (or trace statistic) under texture model. The processing steps are outlined below:

a) Estimate the covariance matrix $\hat{\Sigma}_{sea}$ from selected training area of sea clutter:

$$\hat{\Sigma}_{sea} = \frac{1}{N} \sum_{i=1}^{N} \tilde{s}_i \tilde{s}_i^{*T}, \quad (15)$$

where $\tilde{s}_i$ refers to the complex vector of a pixel i in the identified training area of sea clutter. The variable N denotes the total number of pixels in the training area.

For multi-look polarimetric SAR data, the estimated covariance matrix $\hat{\Sigma}_{sea}$ is given by $$\hat{\Sigma}_{sea} = \frac{1}{N} \sum_{i=1}^{N} \tilde{C}_i, \quad (16)$$

where $\tilde{C}_i$ refers to the polarimetric covariance matrix of a pixel i in the identified training area of sea clutter.

b) Mark the test pixel j as a ship pixel if the following criterion is fulfilled:

$$2 s_j^{*T} \hat{\Sigma}_{sea}^{-1} s_j > u. \quad (17)$$

The upper bound critical value u is obtained by integrating the probability density function of the population squared radius with a desired significance level $\omega$:

$$\omega = 1 - \int_0^u f(\tilde{r}) d\tilde{r}. \quad (18)$$

The significance level $\omega$ is also known as probability of false alarm in other words. For multi-look polarimetric SAR data, the test criterion is defined as $$\tilde{z} > u. \quad (19)$$

The upper bound critical value u is obtained by integrating the probability density function of the trace statistic with a desired significance level.

The integral in formula 18 may be calculated using a value table, which is stored in a computer memory, and interpolation or it may be computed numerically. Likewise, the probability distributions maybe computed by stored values and interpolation and/or by numerical computation.

c) Move to next pixel and repeat Step 2. Terminate the execution if there are no more test pixels to be processed.

Figure 12:
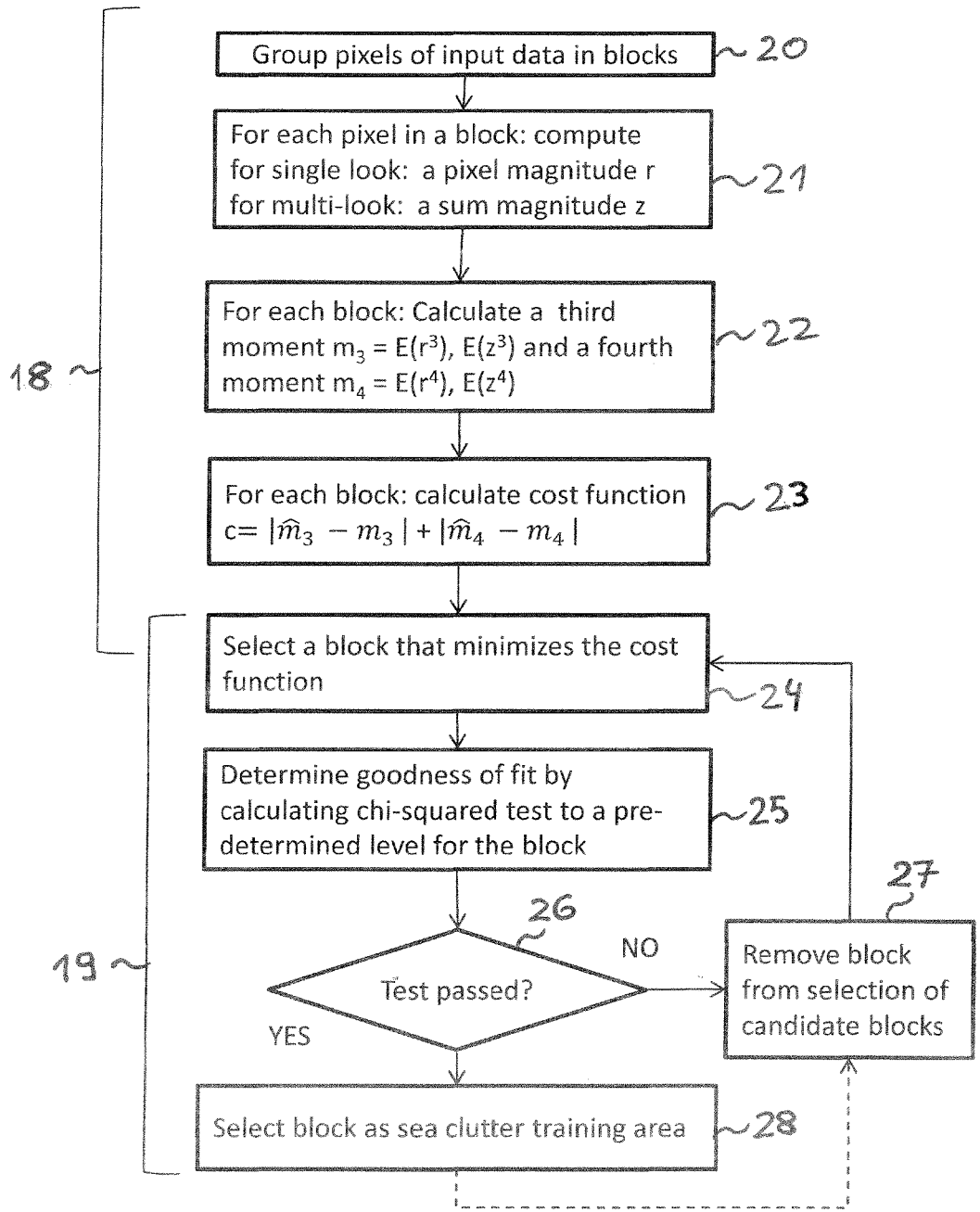
FIG. 12 shows a flow diagram for the selection of a sea clutter training area.
Figure 13:
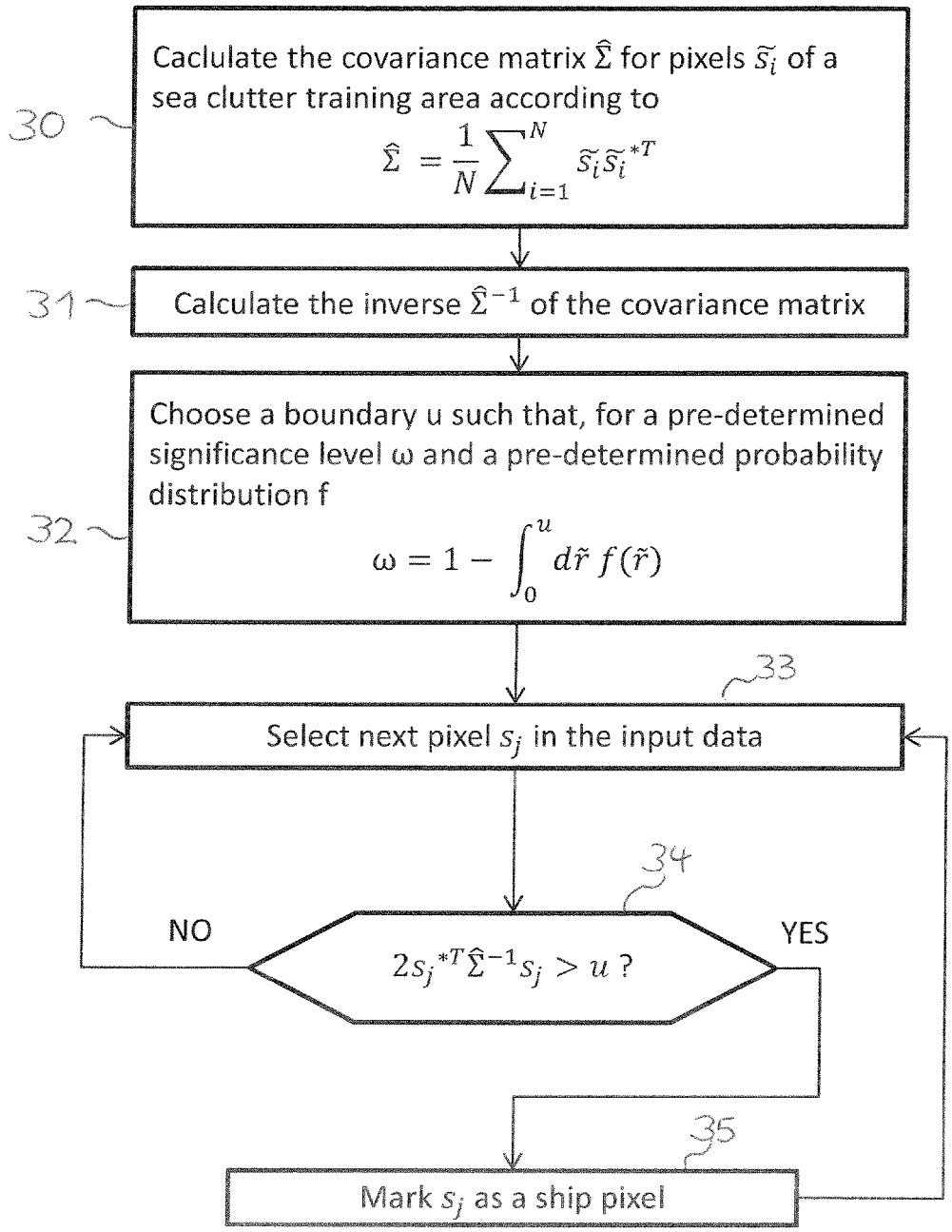
FIG. 13 shows a flow diagram for an identification of pixels belonging to a ship.

A ship detection method according to the application is now explained with reference to the following flow diagrams in which FIG. 12 shows a flow diagram for the selection of a sea clutter training area and FIG. 13 shows a flow diagram for an identification of pixels belonging to a ship.

The selection of a sea clutter training area, as in FIG. 12, determines which block of pixel data is most similar to a pre-determined ideal model of backscatter of sea clutter.

In a step 20, the pixels of the input data are grouped into blocks, for example in blocks of rectangular areas. By way of example, the size of a block for single-look data may be about 200×200 or 400×400 pixels. Often, the resolution is such that 1 pixel corresponds approximately to 1 m. In this case, a big ship comprises approximately 300 pixels while a small boat may have only about 7 pixels.

In one embodiment, an input area which corresponds to the input data is automatically selected such that it does not contain too many artificial objects but has a representative sea clutter. For example, if ships in an area close to a harbor or shipping route are to be detected, the input data may be restricted to areas that are a pre-determined distance away from the harbor or shipping route. Furthermore, the input area has a pre-determined minimum size, such that it contains enough sea clutter.

In a step 21, a pixel magnitude, such as the population squared radius, is calculated for each pixel in a block in the case of single look data. In the case of multi-look data a sum magnitude, such as, a matrix trace of the abovementioned Z-matrix is computed instead of the population squared radius. The pixel magnitude is also referred to as $\tilde{r}$ and the sum magnitude is also referred to as $\tilde{z}$.

As mentioned in the text preceding formula (9), the Z-matrix is defined as $Z = \Sigma^{-1/2} W \Sigma^{-1/2}$ wherein $W = LC$. As shown in formula (8), the matrix C is defined as the arithmetic mean of the individual covariance matrices of the looks. In the case of a single look L=1 the matrix trace of the Z-matrix becomes the population squared radius without the multiplication factor of "2", see formula (17).

Both the pixel magnitude and the sum magnitude may be represented by a matrix trace. For the multi-look case, the trace statistic (under texture model) can be written as:

$$\tilde{z} = \text{tr}(tZ) = t\text{tr}(Z) = t\text{tr}(\Sigma^{-1/2} W \Sigma^{-1/2}) =$$

$$t\text{tr}(\Sigma^{-1} W) = Lt\text{tr}(\Sigma^{-1} C) = Lt\text{r}(\Sigma^{-1} \tilde{C}) = \text{tr}\left(\Sigma^{-1} \sum_{i=1}^{L} \tilde{s}_i \tilde{s}_i^{*T}\right).$$

The matrix trace may also be evaluated as a sum over inner products of pixels s_i of the respective looks.

In contrast, for the single-look case, the population squared radius (under texture model) can be written as $$\tilde{r} = 2\tilde{s}^{*T} \Sigma^{-1} \tilde{s} = 2tr(\Sigma^{-1} \tilde{s}\tilde{s}^{*T}).$$

In a step 22, third and fourth moments are computed for the population squared radius. In step 23, a cost function is computed, the cost function being the sum of the moduli of the respective differences between theoretical and computed third and fourth moments. The theoretical moments are computed according to a sea clutter reference of a magnitude value of the pixels, wherein a shape parameter α of the sea clutter reference distribution has been chosen in a suitable way.

In a next step 24, one or more blocks are chosen which minimize the cost function. The steps 20 to 24 represent a pre-selection procedure 18 of a sea clutter training area.

In a next step 25, a goodness of fit test, which uses preferentially the Pearson chi-squared test, is computed for evaluating how well the chosen sea clutter training area conforms to the sea clutter reference distribution. If the pre-selected block, which was selected in step 24, passes the chi-squared test to a predetermined significance level in a step 26, the block is chosen as a sea clutter training area in step 27.

Else, the block is removed from a selection of candidate blocks in a step 28, the procedure loops back to step 24 and another block for which the cost function has the same or the next lowest value is chosen as pre-selected block in step 24. Initially, the selection of candidate blocks comprises all blocks of the input data, which are determined in step 10. Steps 24 to 28 represent a final block selection procedure 19.

The dotted line indicates an optional further step, according to which further sea clutter training areas may be selected in addition to the already selected sea clutter training area. For example, a parameter may specify that five more blocks—or another pre-determined number of blocks—are selected which correspond to the next best fits.

A pre-selection according to the present application, which uses a partial information of the probability distribution, such as the third and fourth moments, can speed up the selection process of a sea clutter training area as compared to calculating a goodness of fit test for every block of pixels. Generally, higher moments allow to resolve smaller objects.

It has been found that evaluating only the third moment does not provide sufficient resolution while evaluating the fourth moment or, in particular, the third moment and the fourth moment provides a sufficient resolution. Evaluating higher moments, such as the fifth moment, would provide a still better resolution but it would also increase the computation time. A target detection method according to the present specification may even be so fast that a ship detection can be performed in near real time.

After one or more blocks of pixels have been selected as sea clutter training area in steps 20 to 28, the covariance matrix area of the selected training area is used in the ship detection procedure of FIG. 13, which uses a constant false alarm rate detector.

Among others, the estimated covariance matrix $\hat{\Sigma}_{sea}$ of the sea clutter training area depends on the incidence angle, the geographical conditions and the wind and weather conditions of the sea at the time when the SAR radar image is taken. Generally speaking, a ship or similar technical object, such as an oil rig, has a higher reflectivity than the ocean surface. The reflectivity of the ocean surface, which provides the background against which the ship is detected, is variable and depends on the prevailing conditions.

In a step 30, a covariance matrix of the sea clutter training area is calculated as the mean value of the dyadic product of the pixels, or pixel vectors. In a step 31, the matrix inverse is calculated.

In a step 32, a boundary u is chosen such that for a sea clutter reference distribution, which models the sea clutter, a pre-determined significance level co is obtained.

In the steps 33 to 35, a constant false alarm rate detector is applied to the pixels of the input data to detect target objects against a background of sea clutter in a loop over all pixels of the input data.

A next pixel s_j of the input data is selected in a step 33 and the population squared radius is calculated in a step 34 and compared against the previously chosen threshold u.

If the population squared radius is larger than the threshold, the pixel s_j is marked as a ship pixel in step 28. If it is detected, in step 29, that all pixels have been examined in step 27, the process ends in a step 30. Else, the process loops back to step 26 and the next pixel is selected.

Further processing steps may be used, for example to discriminate ships and oil rigs. Furthermore, it is advantageous to mask out the land area first, such that pixel of land areas are not considered.

The processing steps for selecting the sea clutter training area and for the determination of target pixels may be carried out in the space domain and/or in the frequency domain, wherein the frequencies are spatial frequencies. Moreover, the coefficients of any other suitable basis, such as a basis of wavelet functions may also be used.

The covariance matrix $\Sigma$, which is used in the computation of population squared radius in the calculation of the cost function in steps 11-13 and in the calculation of the goodness-of-fit in step 15 can be estimated from the input data. In particular, the covariance matrix may be computed as an average over all the pixels of the input data according to the definition in formula (6), wherein the expectation value is computed as an arithmetic average.

As indicated above, the one or more parameters of a sea clutter probability distribution, which are used in steps in the calculation of the cost function in steps 11-13 and in the calculation of the goodness-of-fit in step 15 can be computed from the input data. In particular, the shape parameter $\alpha$ can be calculated from the moments of the population squared radius according to Tables 1 to 10. The moments can in turn be calculated as an arithmetic average of the respective power of the population squared radius using the pixels of the input data and the abovementioned covariance matrix Z.

In a simple case, the shape parameter $\alpha$ can be computed as the solution of a linear equation, as for example for the probability distribution according to Table 1. In other cases, for example for the probability distribution of Table 5, the shape parameter $\alpha$ can be computed as the solution of one or more equations which may also comprise higher powers of $\alpha$. A prior knowledge of a likely range of $\alpha$ may be used to discard unwanted solutions of a quadratic or higher order equation and/or to provide an initial value to an equation-solving algorithm, such as the Newton method.

Figure 14:
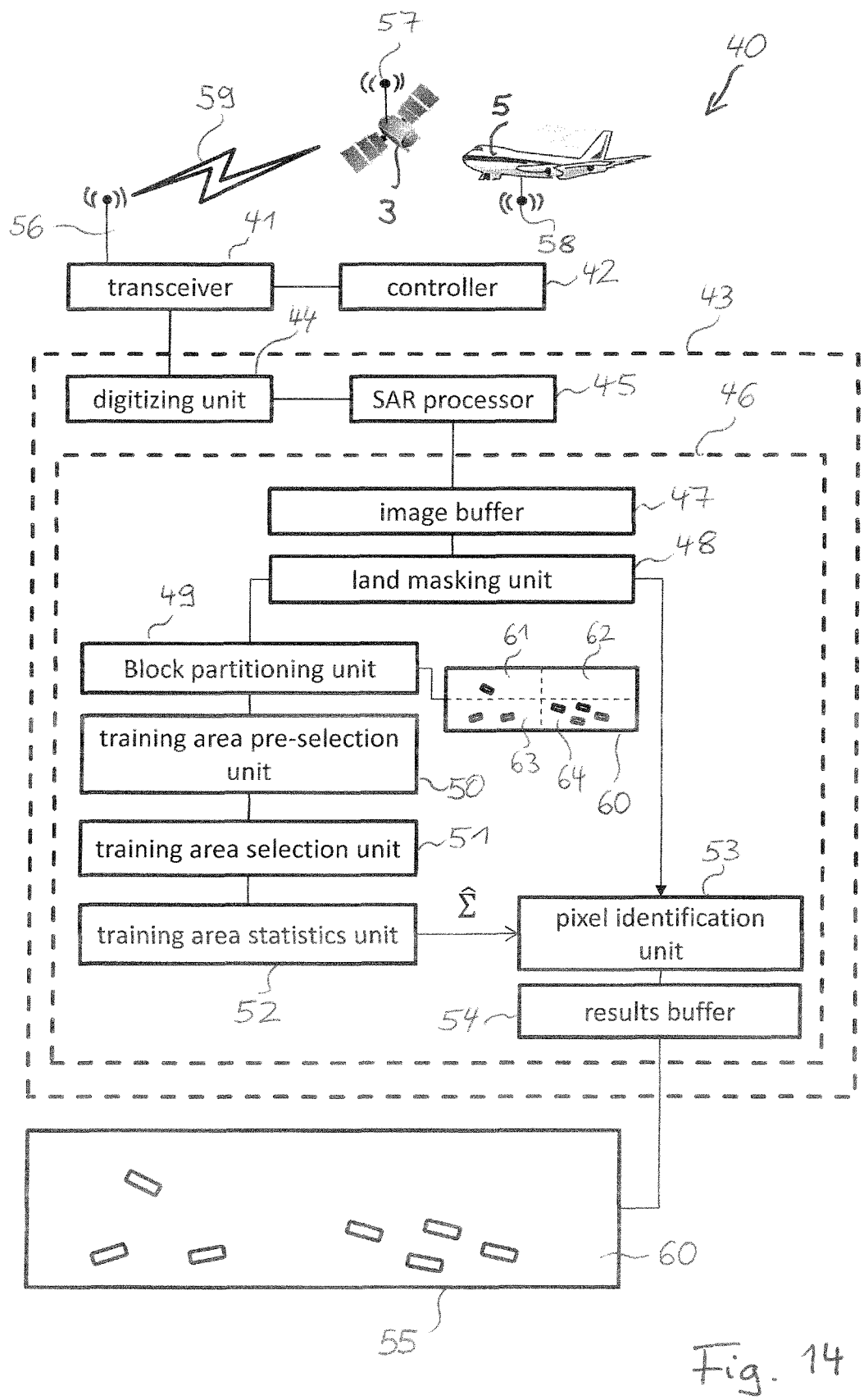
FIG. 14 shows a SAR system for detecting ships in SAR images.

FIG. 14 shows, by way of example, a SAR system 40 for detecting ships in SAR images. The SAR system 40 comprises a transceiver 41 and a controller 42 for controlling the transceiver 41.

The transceiver 41 is connected to a data processing unit 43. The data processing unit 43 is furthermore connected to peripheral devices, such as a display 55 for displaying the results of the data analysis and an external computer readable memory for storing the results, which is not shown in FIG. 14.

A digitizing unit 44 of the data processing unit 43 is connected to the transceiver 41 and to an SAR processor 45. An image processor 46 is connected to the SAR processor 45.

The image processor 46 comprises an image buffer 47, a land masking unit 48, a block partitioning unit 49, a sea clutter training area pre-selection unit 50, a sea clutter training area selection unit 51, a training area statistics calculation unit 52, a pixel identification unit and a results buffer 54.

The components 44 to 54 of the data processing unit 43 may be realized by suitable electronic components, such as microprocessors, application specific circuits, integrated circuits, computer readable memory and/or computer readable instructions in a computer readable memory. The computer readable memory may comprise, among others a read only memory, a read and write memory, a semiconductor memory, an EPROM, an EEPROM, a flash memory or combinations thereof.

The transceiver 41 is connected to an antenna 56. The antenna 56 receives input data from a communication antenna 58 of the plane 5 or from a communication antenna 57 of the satellite 3 over a wireless connection 59. The input data represent pixels of SAR images.

By way of example, the partitioning of the input data into blocks in computer memory is shown as a sea area 60, which is subdivided into a first region 61 comprising a first block of pixels, a second region 62 comprising a second block of pixels, a third region 63 comprising a third block of pixels and a fourth region 64 comprising a fourth block of pixels. In the example of FIG. 14, the first region 61 comprises one ship, the second region 62 comprises no ships, the third region 63 comprises two ships and the fourth region comprises four ships.

According to other embodiments, a communication link between the data processing unit 43 and an aircraft 5 comprises a computer network, such as an ethernet or the internet. The antennas 56, 57, 58 are shown schematically and may have any suitable shape, such as an antenna dishes.

According to a further embodiment, the data processing unit 43 comprises a connection for reading in input data from an external data storage medium, such as a USB storage medium, a DVD or the like, and is read into the image buffer 47 via a data connection.

According to further embodiments, the computation unit 43 is provided on the aircraft 5 and connected to the radar 4 of the aircraft or the computation unit 43 is provided on the satellite 3 and connected to the radar 4 of the satellite 3. In these embodiments, a transceiver and a communication antenna may be provided to send the raw signal data or the processed image data to a receiving ground station.

During operation, the transceiver 43 receives image data of an SAR radar over the wireless communication link 59. The digitizing unit 44 decodes the pixel information of the image data, encodes the image data into a binary format and forwards it to the SAR processor 45. The SAR processor 45 performs a pre-processing of the image data such as a Fast Fourier Transform, image enhancement procedures or other processing steps. The SAR processor 45 then stores the pre-processed data in the image buffer 47 of the image processor 46.

The block partitioning unit 49 retrieves the data of the image buffer 47, wherein land areas pixels of land areas are masked out by the land masking unit 48, and partitions it into suitably sized blocks. The training area pre-selection unit 50 selects on or more of these blocks according to predetermined criteria, such as the value of a cost function which is based on statistical moments of the input data, and in particular on statistical moment of the population squared radius.

The training area selection unit 51 selects on or more of the pre-selected blocks as a sea clutter training area according to its similarity to a pre-determined sea clutter distribution. The training area statistics unit 52 calculates a covariance matrix from the selected sea clutter training area and stores it for later use.

The pixel identification unit retrieves the input data of the image buffer 47 and determines, for each of the pixels a population squared radius using the previously stored covariance matrix of the sea clutter training area. The pixels which are detected as target pixels according to a constant false alarm rate detector, or references to those pixels, are stored in a results buffer 54.

The display 55 uses the data from the results buffer and, optionally, the data from the image buffer 47 to display the sea area in which the detected pixels are marked, for example by the brightness. The result data of the results buffer 54 may be displayed separately for different polarizations or they may be combined in one display, as shown in FIG. 14.

The land masking unit 48 masks out the land areas and forwards the data to the block partitioning unit 49. The partitioning into units as shown in FIG. 14 is provided by way of example and may be different in an actual implementation. For example, the land masking of the land masking unit 48 and the pre-selection of the pre-selection unit 50 are optional and may also be omitted.

During a selection process of a sea clutter training area, the region 62, which contains no ships or other strongly reflecting man-made objects, is likely to be selected as a sea clutter training area.

The covariance matrix serves as a scaling matrix in the scalar product that defines the population squared radius or in the matrix trace of the Z-matrix. The stronger the sea clutter, the larger the components of the covariance matrix and the smaller the components of the inverse of the covariance matrix. Thereby, a sensitivity of the constant false alarm rate detector is decreased and an unwanted detection of pixels as target objects is avoided.

According to one embodiment, the previously computed global covariance matrix and/or the parameters of the sea clutter reference distribution are compared with the data of the selected sea clutter training area. According to this embodiment, the covariance matrix of the selected sea clutter training area and/or the parameter or the parameters of the empirical distribution in the sea clutter training area are compared to the previously computed global covariance matrix and the previously computed parameters.

According to a further embodiment, the global covariance matrix and/or the parameters of the reference distribution are computed from a suitable chosen subset of the pixels of the input data, for example from a random selection of the pixels of the input data.

REFERENCE DOCUMENTS

Lee J. S., Schuler D. L., Lang R. H., and Ranson K. J., 1994, K-distribution for multi-look processed polarimetric SAR imagery. *Proceedings of the IEEE International Geoscience and Remote Sensing Symposium*, vol. 4, pages 2179-2181.

Lee K. Y. and Bretschneider T. R., 2012, Ship detection in TerraSAR-X high-resolution spotlight dual-polarisation imagery. *Proceedings of the 33$^{rd}$ Asian Conference on Remote Sensing*, paper no. A5-4.

Lee K. Y. and Bretschneider T. R., 2013, Statistical modelling of sea clutter in airborne S-band fully polarimetric synthetic aperture radar imagery. *Proceedings of the 34$^{th}$ Asian Conference on Remote Sensing*, pages SC01-49-56.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

For example, the methods and devices according to the application are not limited to fully polarimetric SAR data having "VV" "HV", "VH" and "HH" components but can also be used for pixels of dual-polarization data, which only comprise a "VV" and a "HH" component.

The embodiments can also be described with the following lists of elements being organized into items. The respective combinations of features which are disclosed in the item list are regarded as independent subject matter, respectively, that can also be combined with other features of the application.

A computer implemented method for automatically selecting at least one sea clutter training area in single look polarimetric synthetic aperture radar imagery comprising
 providing input data of a polarimetric synthetic aperture radar, the input data comprising pixels, the pixels comprising amplitude and phase values of electromagnetic signals,
 providing a sea clutter reference distribution for a pixel magnitude,
 computing one or more parameters of the sea clutter reference distribution based on the input data,
 computing a global covariance matrix based on the input data,
 grouping the pixels of the input data into blocks,
 computing, for each block, a pixel magnitude using the inverse of the global covariance matrix,
 computing, for each block, one or more empirical moments of the pixel magnitude for the pixels of the block,
 computing one or more reference moments of the pixel magnitude based on the sea clutter reference distribution,
 computing, for each block, a cost function, wherein the computation of the cost function comprises the computation of respective differences between the empirical moments and the reference moments,
 pre-selecting a block with a smallest value of the cost function,
 calculating a goodness-of-fit test for the pixel magnitude of the pixels of the pre-selected block compared to the sea clutter reference distribution,
 selecting the pre-selected block as a sea clutter training area if the block passes the goodness-of-fit test, else repeating the steps of pre-selecting a block and calculating the goodness-of-fit test until a block is found which passes the goodness-of-fit test.

A computer implemented method for automatically selecting at least one sea clutter training area in multi-look polarimetric synthetic aperture radar imagery comprising
 providing input data of a polarimetric synthetic aperture radar, the digital radar image data comprising pixels, the pixels comprising amplitude and phase values of electromagnetic signals,
 providing a sea-clutter reference distribution for a sum magnitude, the sum magnitude being derived from pixels corresponding to the same location and to the respective looks,
 estimating one or more parameters of the sea clutter reference distribution based on the input data,
 grouping the pixels into blocks,
 computing, for each block, and for each pixel location of the pixels in the block, the sum magnitude,
 computing one or more empirical moments of the sum magnitude for the pixels of a block,
 computing one or more reference moments of the sea-clutter reference distribution,
 computing, for every block of pixels, a cost function, wherein the computation of the cost function comprises the computation of respective differences between the empirical moments and the reference moments, pre-selecting a block with a smallest value of the cost function, calculating a goodness-of-fit test for the sum magnitude of the pixels of the pre-selected block compared to the sea clutter reference distribution, selecting the pre-selected block as a sea clutter training area if the block passes the goodness-of-fit test, else repeating the steps of pre-selecting a block and calculating the goodness-of-fit test until a block is found which passes the goodness-of-fit test.

The method according to any of the above embodiments, wherein the sea clutter reference distribution is the distribution of a magnitude of a first vector valued random variable, the first vector valued random variable representing a pixel and the first vector valued random variable being the product of the square root of a texture variable with a second vector valued variable, wherein the second vector valued variable s is distributed according to a multivariate Gaussian distribution and wherein the distribution of the texture variable is selected from a gamma distribution, an inverse gamma distribution, an inverted beta distribution, an inverse Gaussian distribution and a reciprocal inverse Gaussian distribution.

The method according to any of the above embodiments, wherein the sea clutter reference distribution of the sum magnitude is equal to the distribution of a random variable which is the product of a texture variable t and a variable z, wherein the variable z is distributed according to a gamma distribution and wherein the distribution of the texture variable t is selected from a gamma distribution, an inverse gamma distribution, an inverted beta distribution, an inverse Gaussian distribution and a reciprocal inverse Gaussian distribution.

The method according to one of the preceding embodiments, wherein the cost function comprises computation of the respective differences between the empirical third moment and the third moment of the sea clutter reference distribution and between the empirical fourth moment and the fourth moment of the sea clutter reference distribution.

The method according to one of the preceding embodiments, wherein the goodness-of-fit test is a chi-squared test.

The method according to one of the preceding embodiments, the method comprising a ship detection, the ship detection comprising estimating a covariance matrix from the pixels of the selected sea clutter training area, for every pixel in the input data:

marking a pixel location as a target pixel if a magnitude value of the pixels corresponding to the pixel location exceeds a pre-determined threshold u, the threshold u being determined by a pre-determined probability of false alarm for the sea clutter reference distribution, wherein the magnitude value is the pixel magnitude for single-look input data and wherein the magnitude value is the sum magnitude for multi-look input data.

The method according to the previous above embodiment, the target detection comprising a step of masking out land areas.

The method according to one of the preceding embodiments, the selection of a sea clutter training area comprising a step of masking out land areas.

A computer instruction set for executing the steps of the method according to one of the preceding embodiments.

A computer readable memory comprising the computer instruction set of any of the above embodiments.

A computation unit for executing the steps of the method according to one of the above embodiments.

A ship detection device comprising a connection for receiving synthetic aperture radar input data, an SAR processor for converting the received data into pixel data, an image buffer for storing the pixel data, a block partitioning unit for partitioning the input data into blocks of pixels, a sea clutter training area selection unit for selecting one or more of the blocks as a sea clutter training area according to the conformance of the pixel values to a pre-determined sea clutter reference distribution, a sea clutter statistics calculation unit for deriving a sea clutter covariance matrix from pixel values of the selected sea clutter training area, a pixel identification unit for identifying pixel locations as target pixels based on a magnitude value, the magnitude value being derived from the sea clutter covariance matrix and the pixel values of the pixels corresponding to the pixel location, a results buffer for storing the pixel identification results.

The ship detection device of any of the above embodiments, comprising a sea clutter training area pre-selection unit for pre-selecting one or more of the blocks, wherein the pre-selection is based on a difference between an empirical third moment of the magnitude value and a third moment of the sea clutter reference distribution and on a difference between an empirical fourth moment of the magnitude value and a fourth moment of the sea clutter reference distribution, and wherein the sea clutter selection unit uses the pixels of the one or more pre-selected blocks as input values.

The invention claimed is:

1. A computer implemented method for automatically selecting at least one sea clutter training area in single look polarimetric synthetic aperture radar imagery, the method comprising:

generating, using a polarimetric synthetic aperture radar, input data;

receiving the input data from the polarimetric synthetic aperture radar to a computer, wherein the input data comprises pixels, the pixels comprising amplitude and phase values of electromagnetic signals;

receiving, at the computer, a sea clutter reference distribution for a pixel magnitude;

computing one or more parameters of the sea clutter reference distribution based on the input data;

computing a global covariance matrix based on the input data;

grouping the pixels of the input data into blocks;

computing, for each block, a pixel magnitude using an inverse of the global covariance matrix;

computing, for each block, one or more empirical moments of the pixel magnitude for the pixels of the block;

computing one or more reference moments of the pixel magnitude based on the sea clutter reference distribution;

computing, for each block, a cost function, wherein computing the cost function comprises a computation of respective differences between the empirical moments and the reference moments;

pre-selecting a block with a smallest value of the cost function;

calculating a goodness-of-fit test for the pixel magnitude of the pixels of the pre-selected block compared to the sea clutter reference distribution;

when the pre-selected block passes the goodness-of-fit test, selecting the pre-selected block as a sea clutter training area; and when the pre-selected block does not pass the goodness-of-fit test, repeating steps of pre-selecting a block and calculating the goodness-of-fit test until one of the blocks is found which passes the goodness-of-fit test.

2. The method of claim 1, wherein the sea clutter reference distribution is a distribution of a magnitude of a first vector valued random variable, the first vector valued random variable representing a pixel and the first vector valued random variable being a product of a square root of a texture variable with a second vector valued variable s, wherein the second vector valued variable s is distributed according to a multivariate Gaussian distribution, and wherein a distribution of the texture variable is selected from a gamma distribution, an inverse gamma distribution, an inverted beta distribution, an inverse Gaussian distribution, and a reciprocal inverse Gaussian distribution.

3. The method of claim 1, wherein the cost function comprises a computation of respective differences between an empirical third moment and a third moment of the sea clutter reference distribution and between an empirical fourth moment and a fourth moment of the sea clutter reference distribution.

4. The method of claim 1, wherein the goodness-of-fit test is a chi-squared test.

5. The method of claim 1, further comprising detecting a target, wherein detecting the target comprises:
estimating a covariance matrix from the pixels of the selected sea clutter training area for every pixel in the input data; and
marking a pixel location as a target pixel when a magnitude value of the pixels corresponding to the pixel location exceeds a pre-determined threshold u, the pre-determined threshold u being determined by a pre-determined probability of false alarm for the sea clutter reference distribution, wherein the magnitude value is the pixel magnitude.

6. The method of claim 5, wherein detecting the target comprises masking out land areas.

7. The method of claim 1, wherein selecting the sea clutter training area comprises masking out land areas.

8. A non-transitory computer readable memory comprising:
a computer instruction set that, when executed by one or more processors of a computation unit in electronic communication with a polarimetric synthetic aperture radar, causes the computation unit to:
receive input data from the polarimetric synthetic aperture radar, wherein the input data comprises pixels, the pixels comprising amplitude and phase values of electromagnetic signals, and wherein the input data is generated by the polarimetric synthetic aperture radar;
receive a sea clutter reference distribution for a pixel magnitude;
compute one or more parameters of the sea clutter reference distribution based on the input data;
compute a global covariance matrix based on the input data;
group the pixels of the input data into blocks;
compute, for each block, a pixel magnitude using an inverse of the global covariance matrix;
compute, for each block, one or more empirical moments of the pixel magnitude for the pixels of the block;
compute one or more reference moments of the pixel magnitude based on the sea clutter reference distribution;
compute, for each block, a cost function, wherein computation of the cost function comprises a computation of respective differences between the empirical moments and the reference moments;
pre-select a block with a smallest value of the cost function;
calculate a goodness-of-fit test for the pixel magnitude of the pixels of the pre-selected block compared to the sea clutter reference distribution;
when the pre-selected block passes the goodness-of-fit test;
select the pre-selected block as a sea clutter training area; and
display at least the sea clutter training area on a display; and
when the block does not pass the goodness-of-fit test, repeating steps of pre-selecting a block and calculating the goodness-of-fit test until one of the blocks is found which passes the goodness-of-fit test.

9. A computation unit, in electronic communication with a polarimetric synthetic aperture radar, comprising:
one or more processors and a non-transitory computer readable memory,
wherein the computation unit is configured to:
receive input data from the polarimetric synthetic aperture radar, wherein the input data comprises pixels, the pixels comprising amplitude and phase values of electromagnetic signals, and wherein the input data is generated by the polarimetric synthetic aperture radar;
receive a sea clutter reference distribution for a pixel magnitude;
compute one or more parameters of the sea clutter reference distribution based on the input data;
compute a global covariance matrix based on the input data;
group the pixels of the input data into blocks;
compute, for each block, a pixel magnitude using an inverse of the global covariance matrix;
compute, for each block, one or more empirical moments of the pixel magnitude for the pixels of the block;
compute one or more reference moments of the pixel magnitude based on the sea clutter reference distribution;
compute, for each block, a cost function, wherein computation of the cost function comprises a computation of respective differences between the empirical moments and the reference moments;
pre-select a block with a smallest value of the cost function;
calculate a goodness-of-fit test for the pixel magnitude of the pixels of the pre-selected block compared to the sea clutter reference distribution;
when the pre-selected block passes the goodness-of-fit test;
select the pre-selected block as a sea clutter training area; and
display at least the sea clutter training area on a display; and when the block does not pass the goodness-of-fit test, repeating steps of pre-selecting a block and calculating the goodness-of-fit test until one of the blocks is found which passes the goodness-of-fit test.

10. The computation unit of claim 9, wherein the sea clutter reference distribution is a distribution of a magnitude of a first vector valued random variable, the first vector valued random variable representing a pixel and the first vector valued random variable being a product of a square root of a texture variable with a second vector valued variable s, wherein the second vector valued variable s is distributed according to a multivariate Gaussian distribution, and wherein a distribution of the texture variable is selected from a gamma distribution, an inverse gamma distribution, an inverted beta distribution, an inverse Gaussian distribution, and a reciprocal inverse Gaussian distribution.

11. A computer implemented method for automatically selecting at least one sea clutter training area in multi-look polarimetric synthetic aperture radar imagery, the method comprising:
generating, using a polarimetric synthetic aperture radar, input data;
receiving the input data of a digital radar image from the polarimetric synthetic aperture radar to a computer, wherein the input data comprises pixels, the pixels comprising amplitude and phase values of electromagnetic signals;
receiving, at the computer, a sea-clutter reference distribution for a sum magnitude, wherein the sum magnitude is derived from pixels corresponding to a same location and to respective looks of the multi-look polarimetric synthetic aperture radar imagery;
estimating one or more parameters of a sea clutter reference distribution based on the input data;
grouping the pixels into blocks;
computing, for each block, and for each pixel location of the pixels in the block, the sum magnitude;
computing one or more empirical moments of the sum magnitude for the pixels of a block;
computing one or more reference moments of the sea-clutter reference distribution;
computing, for every block of pixels, a cost function, wherein computing the cost function comprises a computation of respective differences between the empirical moments and the reference moments;
pre-selecting a block with a smallest value of the cost function;
calculating a goodness-of-fit test for the sum magnitude of the pixels of the pre-selected block compared to the sea clutter reference distribution;
when the pre-selected block passes the goodness-of-fit test, selecting the pre-selected block as a sea clutter training area; and
when the block does not pass the goodness-of-fit test, repeating steps of pre-selecting a block and calculating the goodness-of-fit test until one of the blocks is found which passes the goodness-of-fit test.

12. The method of claim 11, wherein the sea clutter reference distribution of a sum magnitude is equal to a distribution of a random variable which is a product of a texture variable t and a variable z, wherein the variable z is distributed according to a gamma distribution, and wherein a distribution of the texture variable t is selected from a gamma distribution, an inverse gamma distribution, an inverted beta distribution, an inverse Gaussian distribution, and a reciprocal inverse Gaussian distribution.

13. The method of claim 11, wherein the cost function comprises a computation of respective differences between an empirical third moment and a third moment of the sea clutter reference distribution and between an empirical fourth moment and a fourth moment of the sea clutter reference distribution.

14. The method of claim 11, wherein the goodness-of-fit test is a chi-squared test.

15. The method of claim 11, further comprising detecting a target, wherein detecting the target comprises:
estimating a covariance matrix from the pixels of the selected sea clutter training area for every pixel in the input data; and
marking a pixel location as a target pixel when a magnitude value of the pixels corresponding to the pixel location exceeds a pre-determined threshold u, the pre-determined threshold u being determined by a pre-determined probability of false alarm for the sea clutter reference distribution, wherein the magnitude value is the sum magnitude.

16. The method of claim 15, wherein detecting the target further comprises masking out land areas.

17. The method of claim 11, wherein selecting the sea clutter training area comprises masking out land areas.

18. A non-transitory computer readable memory comprising:
a computer instruction set that, when executed by one or more processors of a computation unit in electronic communication with a polarimetric synthetic aperture radar, causes the computation unit to:
receive input data of a digital radar image from the polarimetric synthetic aperture radar, wherein the input data comprises pixels, the pixels comprising amplitude and phase values of electromagnetic signals, and wherein the input data is generated by the polarimetric synthetic aperture radar;
receive a sea-clutter reference distribution for a sum magnitude, wherein the sum magnitude is derived from pixels corresponding to a same location and to respective looks of multi-look polarimetric synthetic aperture radar imagery;
estimate one or more parameters of a sea clutter reference distribution based on the input data;
group the pixels into blocks;
compute, for each block, and for each pixel location of the pixels in the block, the sum magnitude;
compute one or more empirical moments of the sum magnitude for the pixels of a block;
compute one or more reference moments of the sea-clutter reference distribution;
compute, for every block of pixels, a cost function, wherein computation of the cost function comprises a computation of respective differences between the empirical moments and the reference moments;
pre-select a block with a smallest value of the cost function;
calculate a goodness-of-fit test for the sum magnitude of the pixels of the pre-selected block compared to the sea clutter reference distribution;
when the pre-selected block passes the goodness-of-fit test;
select the pre-selected block as a sea clutter training area; and
displaying at least the sea clutter training area on a display; and
when the block does not pass the goodness-of-fit test, repeating steps of pre-selecting a block and calculating the goodness-of-fit test until one of the blocks is found which passes the goodness-of-fit test.

19. The non-transitory computer readable memory of claim 18, wherein the sea clutter reference distribution of a sum magnitude is equal to a distribution of a random variable which is a product of a texture variable t and a variable z, wherein the variable z is distributed according to a gamma distribution, and wherein a distribution of the texture variable t is selected from a gamma distribution, an inverse gamma distribution, an inverted beta distribution, an inverse Gaussian distribution, and a reciprocal inverse Gaussian distribution.

20. A computation unit, in electronic communication with a polarimetric synthetic aperture radar, comprising:
one or more processors and a non-transitory computer readable memory, wherein the computation unit is configured to:
receive input data of a digital radar image of the polarimetric synthetic aperture radar, the input data comprising pixels, the pixels comprising amplitude and phase values of electromagnetic signals, and wherein the input data is generated by the polarimetric synthetic aperture radar;
receive a sea-clutter reference distribution for a sum magnitude, the sum magnitude being derived from pixels corresponding to a same location and to respective looks of multi-look polarimetric synthetic aperture radar imagery;
estimate one or more parameters of a sea clutter reference distribution based on the input data;
group the pixels into blocks;
compute, for each block, and for each pixel location of the pixels in the block, the sum magnitude;
compute one or more empirical moments of the sum magnitude for the pixels of a block;
compute one or more reference moments of the sea-clutter reference distribution;
compute, for every block of pixels, a cost function, wherein computation of the cost function comprises a computation of respective differences between the empirical moments and the reference moments;
pre-select a block with a smallest value of the cost function;
calculate a goodness-of-fit test for the sum magnitude of the pixels of the pre-selected block compared to the sea clutter reference distribution;
when the block passes the goodness-of-fit test;
select the pre-selected block as a sea clutter training area; and
display at least the sea clutter training area on a display; and
when the block passes the goodness-of-fit test, repeating steps of pre-selecting a block and calculating the goodness-of-fit test until one of the blocks is found which passes the goodness-of-fit test.

* * * * *